United States Patent [19]

Meek

[11] 4,438,650

[45] Mar. 27, 1984

[54] ANTI-G SUIT TEST RIG

[75] Inventor: Larry F. Meek, Waterloo, Canada

[73] Assignee: Her Majesty the Queen in right of Canada, as represented by the Minister of National Defence, Ottawa, Canada

[21] Appl. No.: 354,039

[22] Filed: Mar. 2, 1982

[30] Foreign Application Priority Data

Mar. 30, 1981 [CA] Canada .................................. 374186

[51] Int. Cl.$^3$ ............................................. G01L 7/00
[52] U.S. Cl. ................................ 73/432 SD; 128/1 A
[58] Field of Search ........... 73/432 SD, 432 J, 432 K, 73/432 V, 172; 128/1 A, 1 B, 30.2, 399, 400

[56] References Cited

U.S. PATENT DOCUMENTS

| | | | |
|---|---|---|---|
| 2,475,479 | 7/1949 | Clark et al. | 128/1 A |
| 2,558,805 | 7/1951 | Yaglou | 73/172 |
| 2,871,849 | 2/1959 | Chatham et al. | 128/1 A |
| 3,818,756 | 6/1974 | Barron et al. | 73/172 |

Primary Examiner—Gerald Goldberg
Assistant Examiner—Hezron Williams
Attorney, Agent, or Firm—Stevens, Davis, Miller & Mosher

[57] ABSTRACT

A method of testing the effectiveness of Anti-G suits involves the use of a manikin shaped to correspond to the portion of the body over which the suit fits. The manikin is filled with fluid and includes a pressure sensing device to provide an indication of the force exerted by the suit against the manikin upon pressurization of the suit. The volume of fluid displaced also provides an indication of the efficiency of the suit.

8 Claims, 3 Drawing Figures

ANTI-G SUIT TEST RIG

The present invention relates to an apparatus and a method for testing anti-G suits.

During the maneuvering of high speed aircraft, the occupants experience acceleration forces in the physiological vertical direction. With acceleration forces greater than the norm, blood pools in the lower extremities denying the heart adequate venous return and subsequent deprived cardiac output, with resulting loss of consciousness.

In order to reduce the amount of blood pooling, anti-G suit trousers are often worn to pressurize the lower body. These have been produced in several configurations.

The amount of blood pooling is inversely proportional to the amount of pressure applied to the lower body. The effectiveness of an anti-G suit is its ability to effectively apply pressure to the lower body.

The current method of testing anti-G suits for effectiveness incorporates the use of a human centrifuge in order to apply acceleration forces in a controlled manner upon human subjects who are wearing the anti-G suits. The subject makes a subjective evaluation which is used to judge the effectiveness of the suit.

The current methods of anti-G suit evaluation therefore have the disadvantages of requiring the use of a human centrifuge and the use of several human subjects who are required to be exposed to greater than normal accelerative forces. Further, the results obtained only represent a subjective evaluation of anti-G suit effectiveness rather than objective measures.

It is therefore an object of the present invention to obviate or mitigate the above disadvantages.

According to the present invention there is provided a method of testing an anti-G suit comprising the steps of placing said suit on a manikin, filling said manikin with a liquid, pressurizing said suit and measuring the pressure exerted on liquid in said manikin to determine the performance of said suit.

According also to the present invention there is provided an apparatus for testing an anti-G suit comprising a manikin shaped to correspond to the portion of the human body upon which said suit is designed to fit, said manikin being formed from a flexible material and having fluid inlet means and sealing means to seal said fluid inlet means to retain fluid within said manikin, and pressure sensing means associated with said manikin to determine the pressure exerted on fluid in said manikin by a suit placed upon said manikin.

An embodiment to the invention will now be described by way of example only with reference to the accompanying drawings in which.

Figure 1:
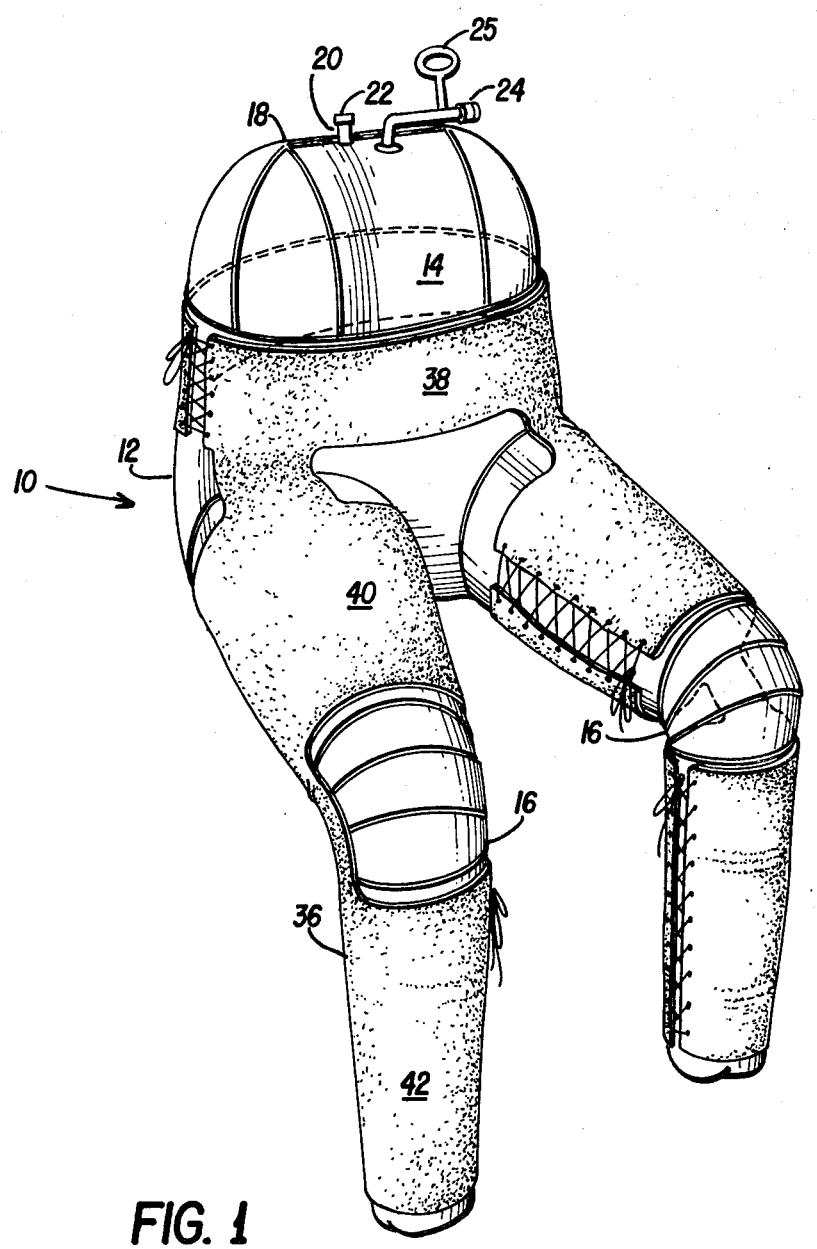
FIG. 1 is a perspective view of a manikin with an anti-G suit shown on the manikin.
Figure 2:
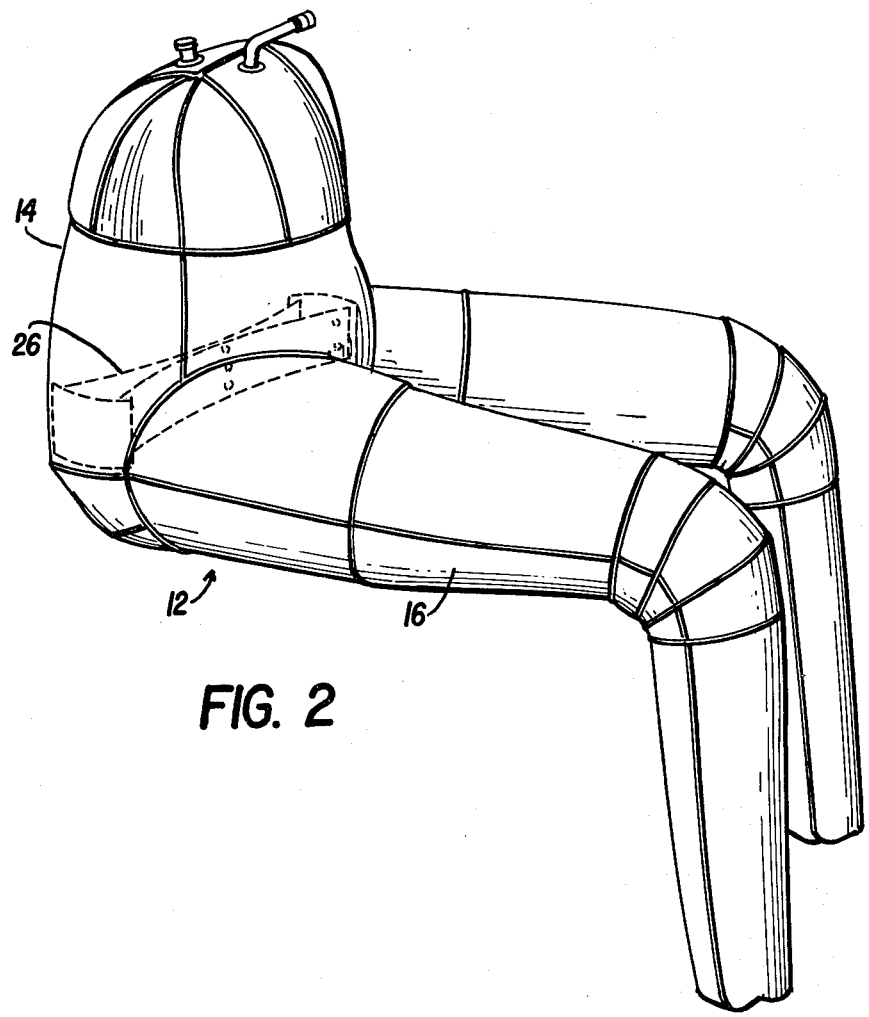
FIG. 2 is a side view of the manikin shown in FIG. 1 without the anti-G suit.

Referring now to FIGS. 1 and 2, test apparatus 10 comprises a manikin 12 formed from flexible material and shaped to simulate the lower torso of the human body. The manikin includes a generally cylindrical abdominal portion 14 and a pair of leg portions 16. Each of the leg portions 16 is bent at the region of the knee to correspond to the position adopted by a pilot in an aircraft during operation of the aircraft.

An upper wall 18 of the abdominal portion 14 includes a fluid inlet 20 provided with a sealing cap 22. Also attached to the upper wall 18 is a pressure relief valve assembly 24 which prevents overpressurization of the manikin 12 and permits egress of fluid under pressure from the manikin.

A pressure gauge 25 is connected in series with the pressure relief assembly to provide an indication of fluid pressure within the manikin. Although a pressure gauge is shown, it will be apparent that other forms of pressure transducers could be used.

Figure 3:
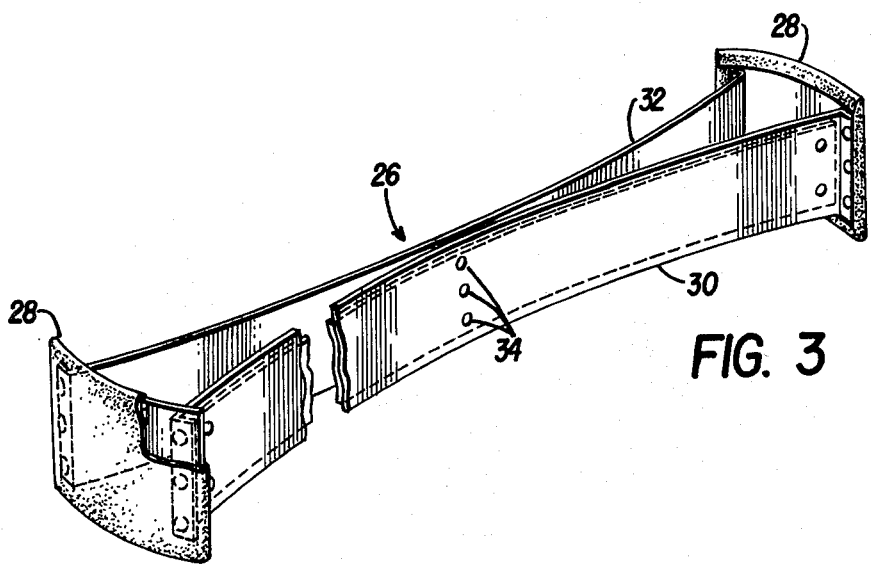
FIG. 3 is a view showing the localized support used in the manikin shown in FIGS. 1 and 2 to simulate the pelvic girdle.

Located within the abdominal portion 14 at a height corresponding to the pelvic girdle is a brace 26. The brace, which is best seen in FIG. 3 comprises a pair of curved pads 28 interconnected by a strut 30. The strut 30 is formed from two curved members 32 which are joined to one another intermediate their ends by rivots 34.

Shown on FIG. 1 is a typical anti-G suit to be tested by the manikin 12. The anti-G suit is a known construction and will therefore not be described in detail. The anti-G suit 36 comprises an inflatable bladder which is divided into three zones, namely an abdominal zone 38, an upper thigh zone 40 and a calf zone 42. Each of these zones is designed to encompass the respective area of the body of the pilot and upon pressurization of the bladder exert a force against the body.

To operate the test apparatus 10, the manikin is firstly filled with fluid, typically water, through the fluid inlet 20 until it adopts the shape of the lower half of the human torso. The inlet is then sealed by the cap 22 and the suit 36 fitted to the manikin. The reading of the pressure gauge 25 is taken with the suit in an uninflated condition and the suit 36 then inflated to normal operating pressure. The pressure gauge 25 will register an increase in pressure which is indicative of the force exerted by the suit on the body. This reading is noted and compared with the readings obtained for a previously tested known suit which is used as a standard.

As a further test, the pressure relief assembly 24 may be adjusted so that fluid from the manikin is expelled upon pressurization of the suit 36. The relief valve will offer a predetermined back pressure in the manikin and the displacement of fluid from within the manikin can be compared with that obtained on the standard suit and used as an indication of the effectiveness of the suit.

The brace 26 provides the rigidity associated with the pelvic girdle in the human torso and therefore avoids inaccurate readings due to abnormal compression of the abdominal zone 38.

It will be seen therefore that the test apparatus and the method of testing the suits provides an objective evaluation of different designs of suits which may be compared with one another and against the standard to provide an indication of their performance prior to testing on a human.

Further modifications to the apparatus are possible, such as the partitioning of the manikin to simulate the different zones of the torso. In this situation it would be possible to measure the pressure increase in each of the zones and therefore obtain a pressure profile of the forces exerted by the suit. It may also be possible to provide restrictive flow between the zones so that the effectiveness of the suit in displacing fluid from one zone to another can be evaluated. It will also be appreciated that the manikin can be shaped to correspond to other portions of the torso such as the upper torso or the arm to test the effectiveness of suits used in these areas.

The Embodiments of the Invention in which an exclusive property or privilege is claimed are defined as follows:

1. A method of testing an anti-G suit comprising the steps of placing said suit on a manikin, filling said manikin with a liquid, pressurizing said suit and measuring the pressure exerted on liquid in said manikin to determine the performance of said suit.

2. A method according to claim 1 including the step of measuring the volume of liquid displaced from said manikin upon pressurization of said suit.

3. A method according to claim 1 or 2 including the step of locally reinforcing said manikin to simulate the pelvic girdle of a human body.

4. Apparatus for testing an anti-G suit comprising a manikin shaped to correspond to the portion of the human body upon which said suit is designed to fit, said manikin being formed from a flexible material and having fluid inlet means and sealing means to seal said fluid inlet means to retain fluid within said manikin, and pressure sensing means associated with said manikin to determine the pressure exerted on fluid in said manikin by a suit placed upon said manikin.

5. Apparatus according to claim 4 wherein said manikin corresponds to the lower torso and includes local reinforcing means to simulate the pelvic girdle of said torso.

6. Apparatus according to claim 5 wherein said local reinforcing means includes a pair of curved pads held in spaced relationship by a strut.

7. Apparatus according to claim 4 including fluid outlet means to permit fluid to be displaced from said manikin upon pressurization of a suit upon said manikin.

8. Apparatus according to claim 4, 5 or 6 wherein said manikin is formed to correspond to the shape the body would adopt during operation of an aircraft.

* * * * *